Figure 1:
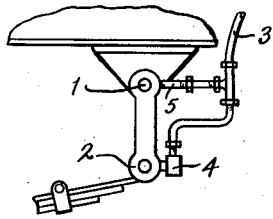

Sept. 11, 1934.  W. H. SHAW  1,972,907
LUBRICANT FLOW REGULATOR
Filed April 27, 1933

INVENTOR.
William H. Shaw
BY
Fay, Oberlin & Fay
ATTORNEYS

Patented Sept. 11, 1934

1,972,907

UNITED STATES PATENT OFFICE 1,972,907

LUBRICANT FLOW REGULATOR

William H. Shaw, Williamsport, Pa., assignor to Shaw Products Corporation, Cleveland, Ohio, a corporation of Ohio

Application April 27, 1933, Serial No. 668,218

12 Claims. (Cl. 184—7)

The present invention, relating as indicated to a lubricant flow regulator, has more particular reference to a means for maintaining a uniform and constant flow of lubricant in a machinery lubricating system regardless of the chief extrinsic factor of variation to which the flow of lubricant in the system is subjected, namely, that of temperature change. It is contemplated that the device embodying the principle of my invention may be applicable to any type of machinery lubricant distribution system, but more precisely it is best adapted for installation in a lubricating system for an automotive vehicle. Inasmuch as the several bearings throughout such a last-named lubricating system will be subjected to substantial differences in temperature conditions, it is obvious, that given a constant lubricant supply pressure and a constant size of orifice at each bearing, that those bearings which are located at points of greater temperature will receive a greater supply of lubricant than those subjected to a lower temperature, due to the viscosity-temperature variation properties of most lubricants. Maintaining a constant flow regulation of lubricant to each bearing in the system will therefore possess the advantage of insuring a proper and even lubricant supply to each bearing throughout the system.

It is also one of the advantages of my lubricant flow regulating device, that excessive waste of lubricant by virtue of the fact that unwarrented amounts of lubricant might be fed to the bearings during a temperature increase, that a substantial conservation of such over amounts of lubricant is effected. This latter advantage is of particular benefit when a more expensive type of lubricant, such as a specially prepared lubricating compound, is used in the system.

It is therefore the general object of my invention to provide a lubricant flow regulating device which may be simply and quickly installed in a lubricant-distribution system, which will be economical to manufacture, and will possess the maximum durability and resistance to vibration and shocks which are transmitted particularly throughout an automobile chassis.

It is another object to provide means for individually and manually adjusting each individual flow regulator to any predetermined limit, in order that the particular lubricating requirements of each bearing may be adequately accommodated.

To the accomplishment of the foregoing and related ends, said invention, then, consists of the means hereinafter fully described and particularly pointed out in the claims; the annexed drawing and the following description setting forth in detail certain mechanism embodying the invention such disclosed means constituting however, but one of various mechanical forms in which the principle of the invention may be used.

In said annexed drawing:—

Figure 2:
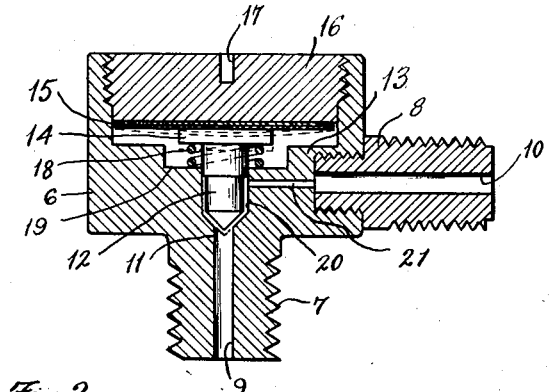
Figure 3:
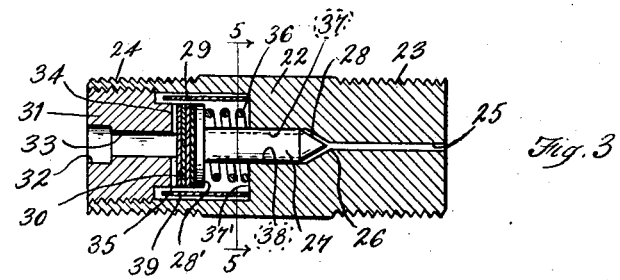
Figure 5:
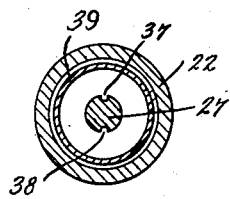
Figure 4:
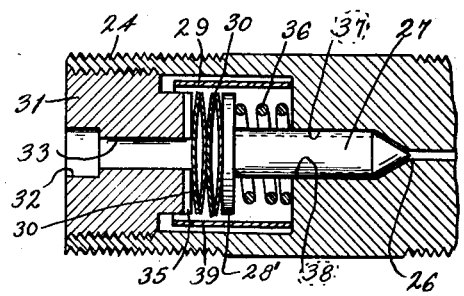

Fig. 1 illustrates the general manner in which a device embodying the principles of my invention may be installed in an automobile chassis lubricant-distribution system; Fig. 2 is an enlarged sectional view of one form of flow regulator constructed according to the principles of my invention; Fig. 3 illustrates a modified form of construction; Fig. 4 is a view similar to Fig. 3 on a slightly enlarged scale and showing the component parts of the device in a different operative position; and Fig. 5 is a transverse section taken substantially along the line 5—5 of Fig. 3.

Now referring more particularly to the drawing, in Fig. 1 there has been shown an illustrative example of the manner in which my device is to be installed. In this figure there is shown a spring shackle having the shackle bolt bearing points 1 and 2. A lubricant supply line 3 leads to each one of the bearings 1 and 2, and inserted in the line are the fittings or regulators 4 and 5, the more precise construction of which is about to be described.

The regulator 4 is of the type as might be termed an angle fitting, the construction of which is illustrated in detail in Fig. 2. In this latter figure, the device as shown consists of a housing member 6 having a threaded fitting portion 7 which is adapted to fit into the bearing housing. A second threaded nipple 8 is attached to another side of the housing member 6 and is adapted to serve as a connection to the lubricant supply line 3. Central passages 9 and 10 in the externally threaded fitting portions 7 and 8, respectively, lead into the interior of the housing member 6. In the passage 9 is a valve orifice 11 with which the conical end of the valve stem 12 is adapted to cooperate. The upper end of the valve stem 12 extends into the enlarged interior portion of the housing 13. This upper end of the valve stem has an enlarged head portion 14 which is adapted to bear against a bi-metallic disk 15. The disk 15 is composed of two metal layers, bonded together, having different coefficients of expansion, such as brass and invar steel, in order that the center of the disk 15 will deflect from the plane of its circumference responsive to thermal changes. The disk 15 is maintained in position by a threaded cap 16 which closes one end of the housing member 6 and may be manually adjustable in its position with respect thereto by virtue of the provision of the slot 17, into which a screwdriver or other appropriate manipulating tool may be inserted. A coil spring 18 is mounted between the under side of the enlarged end portion 14 of the valve stem and the inner wall 19 of the housing member 6. A clearance or passage 20 is provided between the upper periphery of the valve stem 12 and the interior of the housing. A passage or duct 21 communicates with the passage 20 and the passage 10.

The operation of the above described device is as follows: The lubricant supply is conducted through the passage 10, through the passage 21, through the passage 20, to the valve orifice 11, and thence through the passage 9 to the bearing. Upon an increase in temperature the bi-metallic disk 15 will deflect towards its position as shown in dotted lines in Fig. 2 and thereby force the valve stem 12 closer to the orifice 11, in which instance the latter will be reduced, with the result that a less amount of lubricant will be permitted to flow through the device upon temperature increase. Correspondingly, upon temperature decrease the bi-metallic disk 15 will deflect upwardly, or tend to resume its normal position, and the spring 18 will then force the valve stem 12 in an upward direction, to increase the size of the orifice 11 and thereby permit a greater amount of lubricant to pass through the regulating device. In order to initially regulate the size of the orifice 11, according to the requirements of the particular bearing upon which the device is installed, the threaded cap 16 may be adjusted, whereby the position of the bi-metallic disk, as well as its other co-operating parts, will be adjusted to the desired limits.

The form of construction above described is contemplated for the purpose of installation where the lubricant feed line is angularly disposed to the bearing lubricant inlet. Although I have shown the fitting 8 at right angles to the threaded fitting 9, it is equally well contemplated that it may assume any other angular disposition with respect thereto as an equivalent form of construction, so long as the spirit of my invention is not violated. In Fig. 3 I have shown an alternative form of construction for a regulating fitting which is best adapted to an installation where the feed line is in alignment with the bearing inlet opening.

In the alternative or straight-line form of construction shown in Fig. 3, there has been provided a housing member 22 whose opposite ends 23 and 24 are threaded in order to be connected with the bearing and lubricant feed line respectively. A passage 25 is centrally disposed in the bearing end of the fitting and communicates with the valve orifice 26 in the interior of the housing member 22. A valve stem 27, having a conical end 28, is adapted to cooperate with the orifice 26. The other end of the valve stem 27, which is enlarged as at 28', extends into the interiorly enlarged chamber 29 of the housing member 22. A plurality of bi-metallic disks 30, similar in construction to the previously described bi-metallic disk 15, are positioned between the end of the enlarged head portion of the valve stem 27 and the inner end of the removable cap 31. The cap 31 has a slot 32 therein similar to the previously described slot 17 and a central passage 33 which communicates with transverse passageways 34 and 35 leading around the end of the series of bi-metallic disks. A coil spring 36 is mounted between the inner side of the enlarged head portion 28' and the interior wall 37' of the housing member 22. Longitudinal grooves or channels 37 and 38 are provided in the sides of the valve stem 27 for the purpose of placing the interior enlarged chamber 29 in communication with the valve orifice 26. A cylindrical guide sleeve 39 surrounds the enlarged end portion 28' of the valve stem and the series of bi-metallic disks, and serves to maintain the latter in substantial aligned position, while at the same time being slightly spaced therefrom in order to permit a lubricant passage. The series of bi-metallic disks 30 are so assembled in order that like metal layers will be in contact with each other. For example, when the disks 30 are fabricated from brass and invar steel layers, they will be so arranged in assembled relationship that contact, one with the other, will be made in which brass is adjacent to brass and invar adjacent to invar.

The operation of the last described alternative form of construction is as follows: The lubricant is fed into the passage 33, through the passages 34 and 35 into the enlarged interior portion 29, through the longitudinal channels 37 and 38, through the valve orifice 26, and thence through the passage 25 to the bearing.

Upon temperature changes the bi-metallic disks 30 will contract and expand, varying from the position shown in Fig. 3 to that shown in Fig. 4 to correspondingly move the valve stem 27 and vary the size of the orifice 26. The spring 36 will function to counteract the expansive movement of the disks and to insure a positive return movement of the valve stem 27. Similar to the mode of operation as previously set forth in conjunction with the device shown in Fig. 2, the cap 31 may be adjustably positioned in order to predeterminately regulate the size of the orifice 26.

The number of bi-metallic disks which are assembled in the above described embodiment of my invention may be varied. In this connection, it should be noted that the use of a greater number of disks will, of course, increase the amount of movement of the valve. The factors which control the number of disks to be used are the temperature-viscosity characteristics of the lubricant. For example, when a relatively heavy lubricant or oil is to be used, a greater number of bi-metallic disks will be incorporated in the assembly, and, conversely, when lighter oils are used, a lesser number of such disks will be necessary. In other words, the fundamental principle controlling the addition or subtraction of the number of bi-metallic disks to be used is based upon the temperature-viscosity increment characteristics of the particular lubricant used. That is, where the rate of change of the viscosity of the lubricant is relatively high as compared to its temperature, it is desirable that the rate of movement of the valve be relatively greater, or that the thermostatic actuation be increased, and such thermostatic actuation, of course, is dependent upon the number of bi-metallic disks utilized in the device.

It will thus be seen that I have provided a lubricant flow regulating device which is relatively simple in construction, possessing the least number of moving parts, and in which the properties of positive action as well as resistance to shock and vibration are insured.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A lubricant flow regulator comprising the combination of a housing member, a lubricant passage leading through said housing member, valve means in said passage, thermostatic means movable to actuate said valve means, said thermostatic means comprising a plurality of bi-metallic plates loosely and separably mounted in said housing member and an adjustable member contacting said thermostatic means for varying the position of the latter.

2. A lubricant flow regulator comprising the combination of a housing member, a lubricant passage leading through said housing member, valve means in said passage, thermostatic means movable to actuate said valve means, said thermostatic means comprising a plurality of bi-metallic plates loosely and separably mounted in said housing member, an adjustable member contacting said thermostatic means for varying the position of the latter, and a spring element mounted against said valve means and adapted to counteract the movement imparted by said thermostatic means.

3. A lubricant flow regulator comprising the combination of a housing member, a lubricant passage leading through said housing member, valve means in said passage, thermostatic means movable to actuate said valve means, and a closure member forming one wall of said housing, said closure member being threadably engaged therewith and adapted to contact with said thermostatic means and to adjustably vary the position of the latter.

4. A lubricant flow regulator comprising the combination of a housing member, threaded connections on said housing member for insertion of the latter in a lubricating distribution line, a lubricant passage leading through said housing member, valve means in said passage, thermostatic means movable to actuate said valve means, said thermostatic means comprising a plurality of bi-metallic plates loosely and separably mounted in said housing member and an adjustable member contacting said thermostatic means for varying the position of the latter.

5. A lubricant flow regulator comprising the combination of a housing member, a lubricant passage leading through said housing member, valve means in said passage, thermostatic means movable to actuate said valve means, said thermostatic means comprising a plurality of bi-metallic plates loosely and separably mounted in said housing member, an adjustable member contacting said thermostatic means for varying the position of the latter, said adjustable member being exteriorly accessible, and a tool engaging slot in the exterior side of said adjustable member.

6. A lubricant flow regulator comprising the combination of a housing member, passages leading through said housing member, a movable valve stem mounted in said housing member, a valve orifice disposed in said passage and in co-operating relationship to said valve stem, a second passage between said valve stem and said housing member and communicating with said orifice, and a thermostatic element mounted against said valve stem and adapted to actuate the latter, said thermostatic element comprising a plurality of bi-metallic plates loosely and separably mounted in said housing member.

7. A lubricant flow regulator comprising the combination of a housing member, passages leading through said housing member, a movable valve stem mounted in said housing member, a valve orifice disposed in said passage and in co-operating relationship to said valve stem, longitudinal channels in said valve stem, and a thermostatic element mounted against said valve stem and adapted to actuate the latter, said thermostatic element comprising a plurality of bi-metallic plates loosely and separably mounted in said housing member.

8. A lubricant flow regulator comprising the combination of a housing member, passages leading through said housing member, a movable valve stem mounted in said housing member, a valve orifice disposed in said passage and in co-operating relationship to said valve stem, an enlarged end portion on said valve stem, disc-like thermostatic elements loosely and separably mounted adjacent said enlarged end portion, and spring means also mounted against said end portion and adapted to counteract the expansive movement of said thermostatic element.

9. A lubricant flow regulator comprising the combination of a housing member, passages leading through said housing member, a movable valve stem mounted in said housing member, a valve orifice disposed in said passage and in co-operating relationship to said valve stem, an enlarged end portion on said valve stem, a cap member closing one end of said housing member and threadably engaged therewith and disc-like thermostatic elements loosely and separably mounted between said enlarged end portion and said cap member.

10. A lubricant flow regulator comprising the combination of a housing member, passages leading through said housing member, a movable valve stem mounted in said housing member, a valve orifice disposed in said passage and in co-operating relationship to said valve stem, an enlarged end portion on said valve stem, a cap member closing one end of said housing member and threadably engaged therewith, disc-like thermostatic elements loosely and separably mounted between said enlarged end portion and said cap member, and spring means also mounted against said end portion and adapted to counteract the expansive movement of said thermostatic elements.

11. A lubricant flow regulator comprising the combination of a housing member, passages leading through said housing member, a movable valve stem mounted in said housing member, a valve orifice disposed in said passage and in co-operating relationship to said valve stem, an enlarged end portion on said valve stem, a cap member positioned in one end of said housing member and threadably engaged therewith, disc-like thermostatic elements mounted between said enlarged end portion and said cap member, and an opening in said cap member communicating with the interior of said housing member.

12. A lubricant flow regulator comprising the combination of a housing member, passages leading through said housing member, a movable valve stem mounted in said housing member, a valve orifice disposed in said passage and in co-operating relationship to said valve stem, an enlarged end portion on said valve stem, disc-like thermostatic elements mounted adjacent said enlarged end portion, spring means also mounted against said end portion and adapted to counteract the expansive movement of said thermostatic elements, and a cylindrical sleeve surrounding and in spaced relationship to said thermostatic elements and said enlarged end portion.

WILLIAM H. SHAW.